United States Patent [19]

El-Nashar

[11] Patent Number: 4,744,213

[45] Date of Patent: May 17, 1988

[54] PRESSURE-WAVE MACHINE

[75] Inventor: Ibrahim El-Nashar, Kloten, Switzerland

[73] Assignee: BBC Brown, Boveri & Company, Limited, Baden, Switzerland

[21] Appl. No.: 901,978

[22] Filed: Sep. 2, 1986

Related U.S. Application Data

[63] Continuation of Ser. No. 670,932, Nov. 13, 1984, abandoned.

[30] Foreign Application Priority Data

Nov. 30, 1983 [CH] Switzerland ........................ 6402/83

[51] Int. Cl.$^4$ .......................... F02C 3/02; F02G 1/00; F02G 3/00

[52] U.S. Cl. .................................... 60/39.45; 60/280; 60/299

[58] Field of Search .................. 60/39.45 A, 280, 299; 417/64

[56] References Cited

U.S. PATENT DOCUMENTS

| | | | |
|---|---|---|---|
| 3,084,511 | 4/1963 | Klapproth | 60/39.45 A |
| 3,234,736 | 2/1966 | Spalding | 60/39.45 A |
| 3,874,166 | 4/1975 | Kirchhofer et al. | 60/39.45 A X |
| 4,122,673 | 10/1978 | Leins | 60/280 |
| 4,197,700 | 4/1980 | Jahnig | 60/39.04 |
| 4,369,020 | 1/1983 | Rahnke | 417/64 |

OTHER PUBLICATIONS

Druckschrift Nr. CH-T 123,143D, "Aufladung von Fahrzeugdieselmotoren mit Comprex", Jan. 1977, by H. Kirchhofer.

*Primary Examiner*—Louis J. Casaregola
*Assistant Examiner*—Donald E. Stout
*Attorney, Agent, or Firm*—Burns, Doane, Swecker & Mathis

[57] ABSTRACT

A pressure-wave machine for supercharging internal combustion engines having a cellular wheel with surfaces coated with catalyst material.

4 Claims, 1 Drawing Sheet

PRESSURE-WAVE MACHINE

This application is a continuation of application Ser. No. 670,932, filed Nov. 13, 1984, now abandoned.

FIELD OF INVENTION

The present invention relates to pollution control devices and more particularly to pollution control devices comprising gas dynamic pressure-wave machines, adapted to reduce the pollutant content within the exhaust of internal combustion engines.

BACKGROUND OF THE INVENTION

For exhaust emission control, catalysts are used in the exhaust systems of both spark-ignition engines and diesel engines. In the case of spark-ignition engines, these catalysts consist of ceramic filters which are coated with catalytic materials, for example platinum powder. As a result, the engines emit fewer pollutants in their exhaust gases, such as carbon monoxide, unburnt hydrocarbons and nitrogen oxides. The most common exhaust catalysts are so-called three-way catalysts, whereby NO is reduced to $N_2$, CO is oxidized to $CO_2$ by the oxygen from the NO, and the hydrocarbons are oxidized. These catalysts operate at lambda values, that is to say air excess values, of $1\pm0.02$. A lambda probe is required for adjusting the mixture corresponding to this value.

Similar catalysts are used for diesel engines, together with ceramic or metallic support materials. In the diesel engine, however, the problem is a pure oxidation, because a reduction is impossible due to the air excess. In the diesel engine, a catalyst therefore has the task of burning carbon monoxide, hydrocarbons and soot. In addition, soot particle filters are used in diesel engines in order to reduce soot impingement, and these filters can also be catalytically coated, in order to reduce the ignition temperature of the collected soot and hence to burn the soot particles. Filter regeneration can then be achieved in this way. At the same time, this also has a favorable influence on the exhaust emission.

If a spark-ignition engine is supercharged by a gas-dynamic pressure-wave supercharger, the three-way catalyst must be placed on the high-pressure side since, due to the flushing of the cellular wheel of the pressure-wave supercharger, the air excess in the low-pressure exhaust can reach very high values. Consequently, the condition of a lambda value of $1\pm0.02$ cannot be met in the low-pressure side. Furthermore, if the catalyst is arranged in the low-pressure exhaust, the back pressure of the latter rises, so that adequate flushing of the cells of the cellular wheel would not be ensured.

OBJECT AND SUMMARY OF THE INVENTION

It is the present object of the invention to provide a cellular wheel for a pressure-wave supercharger which can be operated even under more stringent criteria with respect to a reduction in the exhaust emission, by exerting the oxidation effect of a catalyst.

The present invention provides a gas-dynamic pressure-wave machine for supercharging internal combustion engines comprising a stator housing and a wheel having cellular surfaces which are exposed to a gas stream of the engine. The aforementioned cellular surfaces are coated with a layer of catalytic material.

As a result of coating those cell surfaces of the cellular wheel which are exposed to the air and gas stream with a catalyst material, the supercharger unit can, in supercharged internal combustion engines, additionally fulfil the function of a catalyst for exhaust emission control. The unit can perform the oxidation activity alone or in addition to a conventional catalyst.

A three-way catalytic action in the cellular rotor is not possible, since the reduction of NO to $N_2$ is not feasible due to the air excess. However, the catalytic action of the rotor meets the oxidation requirements of the diesel engine; in the spark-ignition engine, it satisfies only the pure oxidation requirements.

Compared with a conventional static catalyst, this dynamic cellular rotor catalyst has the following advantages:

It provides a more intensified reaction than the conventionally fitted catalyst, because the flushing air, which is delivered in the pressure-wave machine in addition to the supercharging air and which is flushed over to the gas side of the cellular wheel and into the exhaust stream, has a high oxygen content.

Furthermore, it improves the contact between the catalyst and the gas and enhances catalytic activity, because the gas masses in the cellular wheel of the pressure-wave machine are subjected to strong turbulence and, due to the pressure-wave process, to a long residence time in the cells. These improvements in contact and in catalytic activity are achieved without impairing the rheological function of the cellular wheel.

In addition, the cellular rotor collects and initiates burning of soot. Because a strong centrifugal field exists in the rotor cells, the rotor of the pressure-wave machine is an excellent particle interceptor. With the catalytic coating and the associated reduction of the ignition temperature of soot, the collected soot starts to burn in the cellular rotor.

BRIEF DESCRIPTION OF THE DRAWING

The preferred embodiments of the subject of the invention are represented in the drawings in which.

DETAILED DESCRIPTION OF THE PREFERRED EMBODIMENTS

Regarding the construction and mode of operation of a pressure-wave machine, reference is made to the printed publication No. CH-T 123,143 D of the Applicant.

Figure 1:
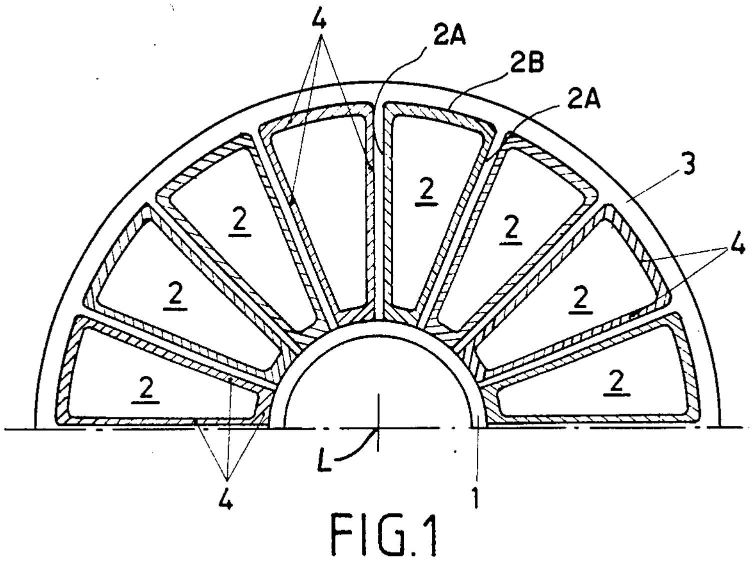
FIG. 1 shows a partial front view of a metallic cellular wheel with a coating of catalyst material in accordance with a preferred embodiment of the present invention.

Referring to FIG. 1, a pressure-wave machine according to the present invention is provided for supercharging an internal combustion engine. The pressure-wave machine includes a cellular wheel 1 having surfaces defining individual cells 2 which carry the air and gas stream. The individual cells 2 are surrounded by a shell on the outside. The machine is rotatable about a longitudinal axis L. Each cell extends parallel to that axis and includes a pair of generally radially extending surfaces 2A and a generally circumferentially extending surface 2B extending between outer edges of the surfaces 2A. The surfaces of the individual cells 2 which are swept by exhaust gas and air are coated with a catalyst material 4, known per se, for example platinum or rhodium. A ceramic base layer which enlarges the surface area is applied in the conventional manner to the metal rotor, and the actual catalyst material is then applied to this layer. In addition, the surface area can be enlarged by increasing the number of cells and/or the number of flows in the rotor.

Figure 2:
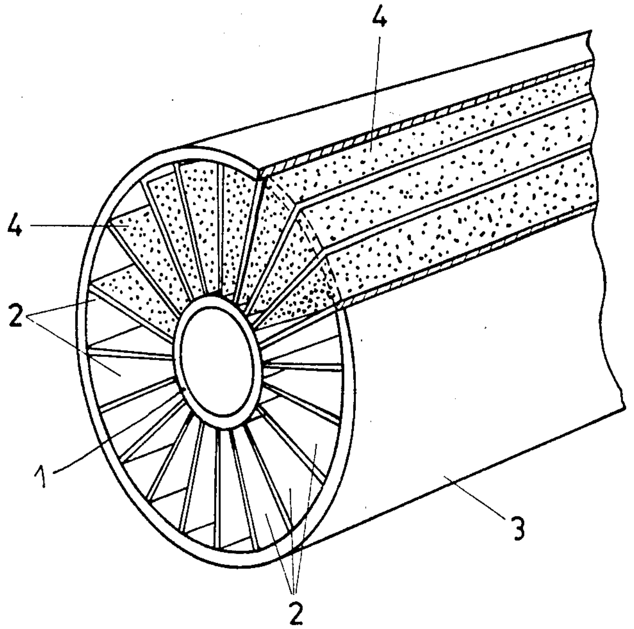
FIG. 2 shows a perspective, sectional view of part of a ceramic cellular wheel with a coating of catalyst material in accordance with another preferred embodiment of the present invention.

In an embodiment of the cellular wheel 1 according to FIG. 2, the cellular wheel 1 consists of a ceramic material. The catalyst material 4 can be sprayed onto the surfaces defining the ceramic cells 2 either before firing of the cellular wheel 1 or only after the burning process in an additional working step.

Since deep penetration of the exhause gases into the cellular wheel 1 takes place only over a part of the axial length thereof, locally limited coating of the cells 2 or admixture of catalyst material 4 to the material of the cellular whell is possible. With such a design, considerable cost reductions can be achieved.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A gas dynamic pressure wave machine for the charging of internal combustion engines, said machine comprising a rotary cellular wheel which is rotatable about a longitudinal axis, said wheel defining a plurality of openended cells extending parallel to said longitudinal axis, each cell including generally radially extending surfaces and a generally circumferentially extending surface extending between outer edges of said generally radially extending surfaces, each cell being exposed during operation alternately to exhaust gas and ambient air, said generally radially extending surfaces and said generally circumferentially extending surfaces being coated with a catalytic material for the control of pollutants by oxidizing the exhaust gas.

2. The device according to claim 1, wherein the cellular wheel is constructed substantially from a ceramic material.

3. The device according to claim 1, wherein the catalytic material includes platinum.

4. The device according to claim 1, wherein the catalytic material includes rhodium.

* * * * *